Oct. 21, 1924. 1,512,603
M. KASSER
EGG PROCESSING MACHINE
Filed Feb. 12, 1923 6 Sheets-Sheet 1

INVENTOR.
MORRIS KASSER
BY White Prost Evans
his ATTORNEYS.

Oct. 21, 1924.

M. KASSER

1,512,603

EGG PROCESSING MACHINE

Filed Feb. 12, 1923

INVENTOR.
MORRIS KASSER.
BY White Prost Evans
his ATTORNEYS.

Oct. 21, 1924.

M. KASSER

EGG PROCESSING MACHINE

Filed Feb. 12, 1923    6 Sheets-Sheet 6

1,512,603

INVENTOR.
MORRIS KASSER
BY White Prost Evans
his ATTORNEYS.

Patented Oct. 21, 1924.

1,512,603

UNITED STATES PATENT OFFICE.

MORRIS KASSER, OF SAN FRANCISCO, CALIFORNIA.

EGG-PROCESSING MACHINE.

Application filed February 12, 1923. Serial No. 618,462.

*To all whom it may concern:*

Be it known that I, MORRIS KASSER, a citizen of the United States, and resident of the city and county of San Francisco, State of California, have invented a certain new and useful Egg-Processing Machine, of which the following is a specification.

This invention relates to a scheme for preserving eggs, and more particularly to a machine adapted to carry on the process in a continuous manner and without the necessity of complex apparatus. The process as employed in the present invention involves the use of a preserving liquid, such as mineral oil, into which the eggs are dipped for a time and removed, in order to form an oil seal for the egg shell pores. In order to secure good results, the oil bath is so regulated and the eggs are so manipulated therein that some of the oil actually enters through the pores of the shell and forms a permanent impervious layer or seal for the egg contents. This layer of oil is deposited while there is a greatly reduced amount of residual air or other gases in the egg itself, and the egg contents are protected against contamination from an external source, since the oil layer is impervious to gases or liquids. In order to secure this result a bath of oil is used so arranged that at and near where the egg enters it, the oil is maintained at a high temperature, of, say, about 200° F. The egg is left immersed in the hot bath for a period long enough to drive off the air from the eggs which escapes through the pores of the shell as the egg expands within its shell. Then, while still immersed in the oil, the bath is cooled to atmospheric temperature, or else the egg is moved to a cool portion of the oil, and the egg contents contract, while oil enters through the pores to take the place of the air which has been driven off. Such a process I have found imparts to the egg highly desirable keeping qualities. It is one of the objects of the invention to provide a machine capable of carrying on the process just outlined in a simple and efficient manner.

In my earlier filed application, entitled "Machine for processing eggs," Ser. No. 376,238 filed April 24, 1920, one type of machine for carrying on the process has been described and claimed. The present machine offers certain advantages over that earlier type; it is therefore another object of my invention to improve the machine described in my earlier application.

It is still another object of this invention to provide a continuously operated machine, such as by conveyor belts, whereby it is merely necessary for the attendant to load the eggs before immersion in the oil, and to unload them after immersion.

It is still another object of the invention to provide an unloading mechanism that insures against careless handling of the eggs, and that is mechanically operated to place the eggs properly within the usual egg crate after they have been treated in the machine.

It is still another object of the invention to provide a system for manipulating the oil used in the machine, so that it is possible to control readily the temperature in various parts of the bath, as well as the depth of the oil itself.

The invention possesses other advantageous features, some of which, with the foregoing, will be set forth at length in the following description, where there will be outlined in full that form of the invention which has been selected for illustration in the drawings accompanying and forming part of the present specification. Although in the drawings there is shown but one embodiment of the invention, it is to be understood that it is not desired that the invention be limited thereto, since the invention as expressed in the claims may be embodied in other forms also.

Referring to the drawings.

In the present instance the sealing liquid such as oil or the like is held in a tank 21, shown as composed of two branches or legs forming an angle at the bottom. This tank holds the liquid 22, which rises to a definite level in both branches 24 and 25. This level is determined by an overflow orifice or aperture 23 leading from the right hand branch 24, over a lip 26 into a cleaning or straining tank 27. Both tanks 21 and 27 may conveniently be formed of sheet metal, and tank 27 for the sake of compactness may conveniently be shaped to be disposed between the branches of sections 24 and 25 of the tank 21. The process of preserving is carried on in the present instance by causing the eggs to enter the branch or section 25 at the left, then moving them downward until branch or section 24 is reached, and finally moving them upward through and out of section 24. The oil in section 25 especially near the top is heated by the aid of any appropriate device, such as steam pipes 28 extending into the tank 21. Any appropriate form of regulator may be used to maintain this portion of the oil at the desired temperature, which is preferably in the neighborhood of 200° F. During the progress of the eggs through the oil, they are subjected to decreasing temperatures, so that they are cooled while submerged in the oil. The travel of the eggs through the sections 25 and 24 is purposely made slow enough to provide sufficient time for the eggs to absorb heat from the hot portion of the bath and gradually to return this heat to the bath before they emerge from the upper end of branch 24. As a guide for determining how fast this movement of the eggs should be, it may be stated that satisfactory results have been found from a one-minute immersion in the oil, although of course this value may be varied within comparatively wide limits without materially affecting the quality of the results.

Figure 1:
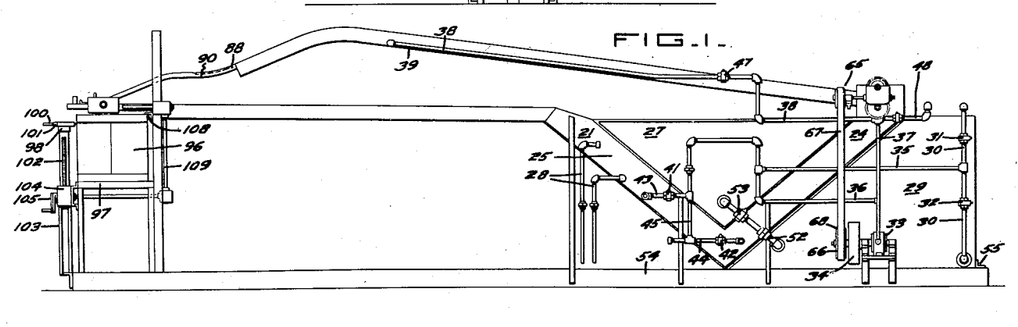
Figure 1 is a side elevation of a complete machine embodying the invention, many of the parts being indicated in a diagrammatic manner.
Figure 2:
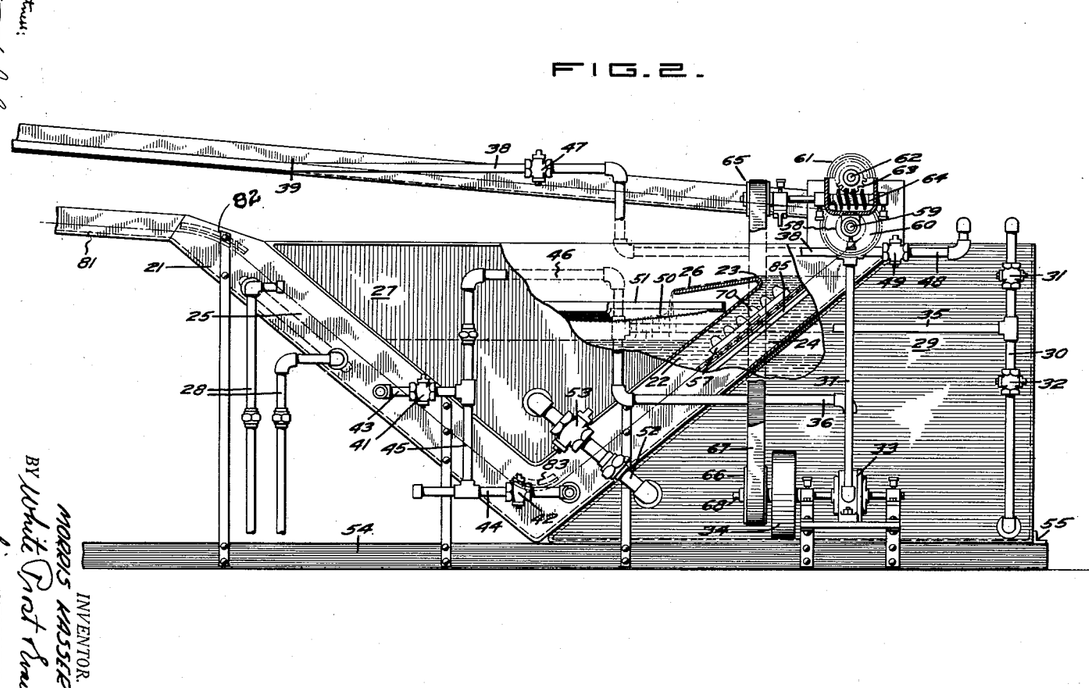
Fig. 2 is an enlarged side elevation of that portion of the machine where the sealing bath is situated, with a portion of the tank being broken away to show the interior more clearly.

Before continuing with the description of the devices employed for moving the eggs through the oil bath, it is advisable to set forth somewhat more fully the manner in which the oil or other liquid may be supplied to the tank 21. This feature of the invention is most clearly illustrated in Fig. 2, wherein is shown a third tank 29 used for a storage reservoir whence oil may be drawn to fill the bath tank 21. A pipe 30 is used for filling the tank 29, which pipe extends to the bottom of the tank. A pair of valves 31 and 32 are located in this pipe, both of which are open when the tank 29 is being filled. When it is desired to fill the tank 21 from tank 29, a pump 33 may be utilized, which pump is adapted to be driven by any appropriate source of power by the aid of a power transmitting mechanism, such as pulley 34. To draw oil from tank 29 into tank 21, valve 31 is closed, while valve 32 is left open. A pipe 35 intermediate the two valves connects to the intake pipe 36 of the pump 33. The discharge pipe 37 is connected to a pipe 38, through which the oil is discharged upon an inclined surface 39. This is most clearly illustrated in Figs. 1 and 3. In the latter figure the lip 40 for this surface is shown, for guiding the oil into the top portion of branch 24. This inclined surface 39 is used to expose the oil in a thin sheet for the purpose of cooling it and draining it back into the tank.

The cooling of the oil in this manner may be accomplished for liquid taken from tank 21, by proper manipulation of certain valves. Thus for this mode of operation both valves 31 and 32 in the intake pipe 30 are closed, while either of valves 41 or 42 is opened. These two latter valves are located in pipes 43 and 44 leading from the intake pipe 36 to points in the tank 21. Thus assuming that valve 42 is open while valve 41 is closed, the oil is pumped from near the bottom of leg 24, through pipes 44, 45, 46 and 36 to the pump intake. The discharge pipe 37 is connected through valve 47 to the cooling pipe 38, and the oil flows on inclined surface 39 over lip 40 back into the tank. Had valve 41 been open and valve 42 closed, oil would have been pumped from near the heated end of branch 25 through the pump 33. The particular mode of pumping is determined by the conditions of operation of the device.

It may sometimes be necessary to empty the tank 21 or at least to drain off some of the oil. For this purpose the discharge pipe 37 has another branch 48 which is controlled by valve 49, which branch 48 discharges the oil back into the storage tank or reservoir 29. By proper manipulation of the valves 47 and 49, it is thus possible to conduct the oil from the pump discharge pipe 37 either to the cooling arrangement or to the storage tank 29. A bottom drain for the tank may also be provided to empty it completely.

Over the tank 27 is disposed a strainer 50 of appropriate construction, whereby liquid flowing over lip 26 passes through this strainer. This strainer may conveniently be made of a piece of burlap stretched on a frame 51 resting on appropriate supports near the top of tank 27. The strainer 50 serves to catch dirt or foreign matter, such as feathers or the like, that may drop into the liquid from the eggs. It is of course preferable to operate the pump 33 continuously so as to cause an appreciable overflow over lip 26 for filtering the oil through tank 27. The oil passes continuously from the tank 27 into the storage tank 29 through the connecting pipe 52 and valve 53. In this way the liquid is drawn into reservoir 29, whence it may again be supplied to the bottom of tank 21. The oil in tank 22 is thus continuously circulated and cooled so that its temperature is not greatly raised by the hot eggs.

It is to be noted that pipe 46, connecting the tank 21 with the intake pipe 36 of the pump 33, rises an appreciable distance above the normal level of oil in the storage tank 29, whereby it is impossible for oil to be supplied through this pipe from tank 29, but instead all oil from the tank 29 must be supplied through pump 33.

In order to provide a proper support for the machine, a steel or iron framwork 54 may be provided, upon which tank 29 rests. An angle iron 55 may be utilized for holding the storage tank 29 securely on this framework.

From the foregoing description it is seen that appropriate devices are employed to provide a liquid bath for the eggs to be treated, a portion of the bath being maintained at a relatively high temperature, and another portion at ordinary atmospheric temperature. The course of the eggs is from the hot region to the cool region, so that as it is gradually carried through the bath, a preserving or sealing layer of liquid is produced within the eggs underneath the shell. The movement of the eggs may be effected manually, but it is preferred to employ a mechanical drive for accomplishing this function. How the eggs are conveyed through the bath from the upper end of section 25 to the upper end of section 24 will now be described.

A pair of conveyor chains 56 continuously driven are used in the present instance for conveying egg trays 57 through the tank 21. These chains are arranged to be appropriately driven, as by the aid of sprocket wheels 58, shown in Figs. 3 and 4, located near the upper end of tank 21. There are two chains arranged side by side, each near one side of the tank 21. The sprocket wheels 58 are located just within the tank 21, and in order not to interfere with the movement of the egg trays 57 around them, each of them is supported and keyed on a short stub shaft 59 extending into the tank 21 from the outside just far enough to accommodate the sprocket wheels. To the external end of each stub shaft is attached a driving gear 60, meshing with a gear 61 supported on a shaft 62 extending entirely across the tank 21, and carrying at one end, a worm wheel 63 which is driven by a worm 64. This worm is appropriately supported in bearings, and may be driven by any appropriate source of power. In the present instance it is shown as connected, by the aid of pulley 65 and 66, and belt 67, with the shaft 68, upon which is located the driven pulley 34. The various gear and pulley sizes are so chosen that the desired speed of movement of the eggs through the tank 21 is obtained.

Figures 5, 6:
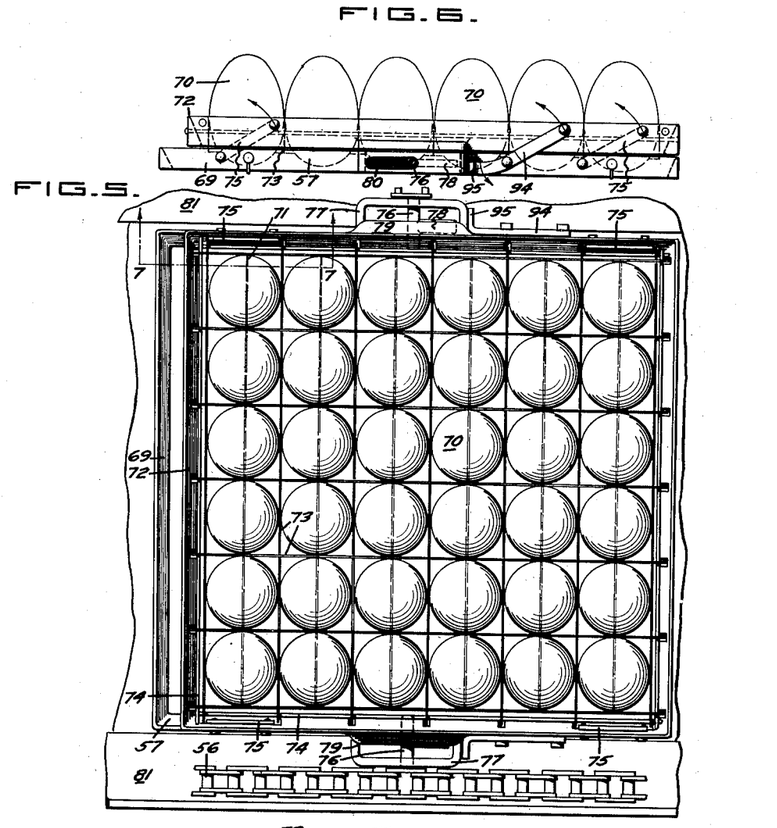
Fig. 5 is a top plan view of one of the egg carriers utilized in the machine.
Fig. 6 is a side elevation of the carrier shown in Fig. 5.

The manner in which the egg trays or carriers 57 are connected to the sprocket chains 56 may best be understood from a consideration of Figs. 5 and 6, which show in greater detail one of the carriers. The tray has a box portion 69 the top of which is entirely open and near the bottom of which are disposed supports for the rows of eggs 70. In the present instance these supports are wires 71 either strung into the bottom portion of the box 69 so as to fall substantially underneath the center points of the eggs 70 in the position shown, or else having a limited lateral movement in slots appropriately provided. Located immediately above the box 69 is another box-like member 72 which is provided with intermeshing or halved strips 73. These strips form substantially rectangular compartments into which the eggs 70 may be deposited, and the center of each of these compartments falls substantially directly over one of the wires 71, so that the egg 70 in each compartment is supported at its lower tip by the wire. The intermeshed strips 73 are preferably formed of thin flexible sheet metal, and resemble in form the paste board strips usually employed in egg boxes to position the eggs therein with the exception that the intermeshing slots in the strips are purposely made wide, about one-eighth of an inch, to permit movement of the strips to accommodate eggs of various sizes. The strips 73 are strung on rods or bars 74 which extend through them and into the sides of the structure 72, the apertures in the strips being larger than the bars to permit the strips to tilt to accommodate eggs of various sizes.

Figure 7:
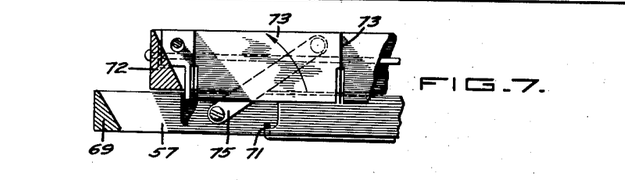
Fig. 7 is a detail sectional view along plane 7—7 of Fig. 5.

The upper frame 72 is appropriately supported so that it does not move relatively to the frame 69 except when it is desired to empty the eggs therefrom. For this purpose the frame 72 is moved laterally to one side or the other so that one of the series of intermeshing strips 73 (the vertical ones of Fig. 5) is directly over the wires 71, and these wires no longer prevent the eggs 70 from dropping entirely through the lower frame 69. In the embodiment shown in Figs. 5, 6 and 7, the upper frame 72 is adapted to be moved to the left. This is accomplished by the aid of links 75, one at each corner of the frames, which links are pivoted to both of these frames. By lifting up on frame 72 and pushing over to the left, these links may be made to guide the movement so as to carry the frame 72 just far enough over to cause the eggs to drop through. The lifting movement of frame 72 is accomplished preferably by the aid of a pair of keys 76, each of which is rigidly connected to one of the links in the sprocket 56. The shanks of these keys serve also as pivotal supports for the egg trays 57, since they pass through projections 77 on each side of the lower frame 69. These projections 77 are guided by appropriately positioned devices against turning movement, as will be hereinafter explained. The key portion 78 of the keys 76 is arranged to coact with a projection 79 of the upper frame 72, extending over the portion 78. It is thus seen that when these keys are rotated in a counter-clockwise direction relative to the frames, they will serve to lift the upper tray 72 and to move it toward the left. The keys are moved to perform this function at the proper time, as will be described later. A slot 80 is formed in the projection 77 through which the keys may be inserted. The egg carrier just described forms the subject matter of a separate application in my name, entitled "Egg carrier", having Serial Number 617,435 and filed February 7, 1923.

The projections 77 of the egg carrier rest upon channels 81 and move over them prior to the entry of the egg tray 56 into the tank 21. Returning now to Fig. 2, these projections are guided by the aid of the curved member 82 engaging the top of the projections, so as to tilt the carrier downward into branch 25 of the tank 21. In this branch itself there is no necessity for sprocket wheels, the weight of the tray itself keeping it in proper position with respect to the channel guide 82 and the sprocket chain 56. At the bottom of tank 21, where the tray 57 enters the branch 24, another guide 83 is provided, for gradually bringing the egg tray 57 into parallelism with the branch 24 and onto the channel guide 85.

Figures 3, 4:
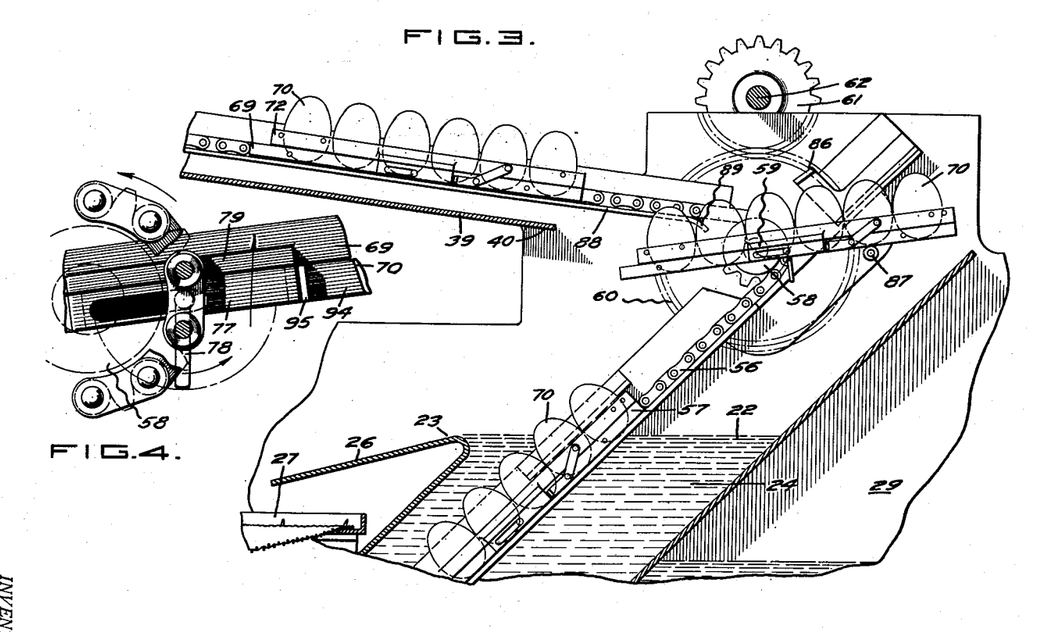
Fig. 3 is a further enlarged sectional view of one end of the tank, and shows how the removal of the eggs from the sealing bath is accomplished.
Fig. 4 is a detail view of some of the elements shown in Fig. 3.

The passage of the egg tray 57 around the driving sprockets 58 may best be understood from a consideration of Figs. 3 and 4. In passing through the tank 21, the tray 57 has its keys 76 disposed to the left. Now as those links to which the keys 76 are fixed pass around the wheels 59, these keys rotate in the same direction as the wheels, so that as shown in Fig. 4 they are carried around in a counterclockwise direction with the sprocket links. The tray 57 however does not turn with the link, since it is prevented from doing so by stops 86 fastened to the inside of the tank 21. These stops coact with projections 77 on each side of tray 57, and further the weight of the tray is so distributed that there is a tendency for it to rotate in a clockwise direction. This in fact occurs, the rotation being limited by the stopping rod 87 coacting with the bottom of the tray 57. As the links to which the keys 76 are connected clear the sprocket wheel, the entire tray is urged to left and upon the upper guide channels 88. These guide channels each have a lip 89 for facilitating the entry of the tray upon them by engaging the projections 77 on each side of the tray. The projections will be in proper position for effecting this due to the lifting action of the sprocket links and to the particular location of the stop rod 87.

The movement of keys 76 during this manipulation of the tray is such that they have no effect upon lifting the upper frame 72 away from the lower frame 69. The keys however are brought from a position where they lie to the left of their pivot to a position where they lie to the right, and in proper position, upon further rotation, to lift and move the upper frame 72 to discharging position.

Figure 11:
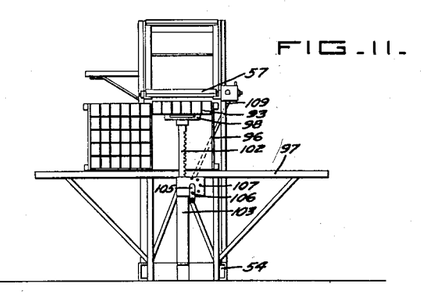
Fig. 11 is a rear view of the unloading end of the machine.

The guide channels 88 extend over the cooling trough 39 for the oil, and any excess oil carried over by the eggs is thus permitted to drain into this trough and reenter the tank 21. Furthermore appropriate brushing devices or the like may be attached at convenient points to wipe off the excess liquid should it be necessary. The trays 57 travel upward along these guide channels 88 until they approach near the unloading end of the machine. This portion of the machine is shown in greater detail in Figs. 8 and 11. The channels 88 slope downward at this end, so as to lead the carriers 57 to the unloading end. A guide 90 for the projections 77 is provided where the downward slope begins so as to prevent the egg tray from tilting away from the channel 88.

Figures 8, 12:
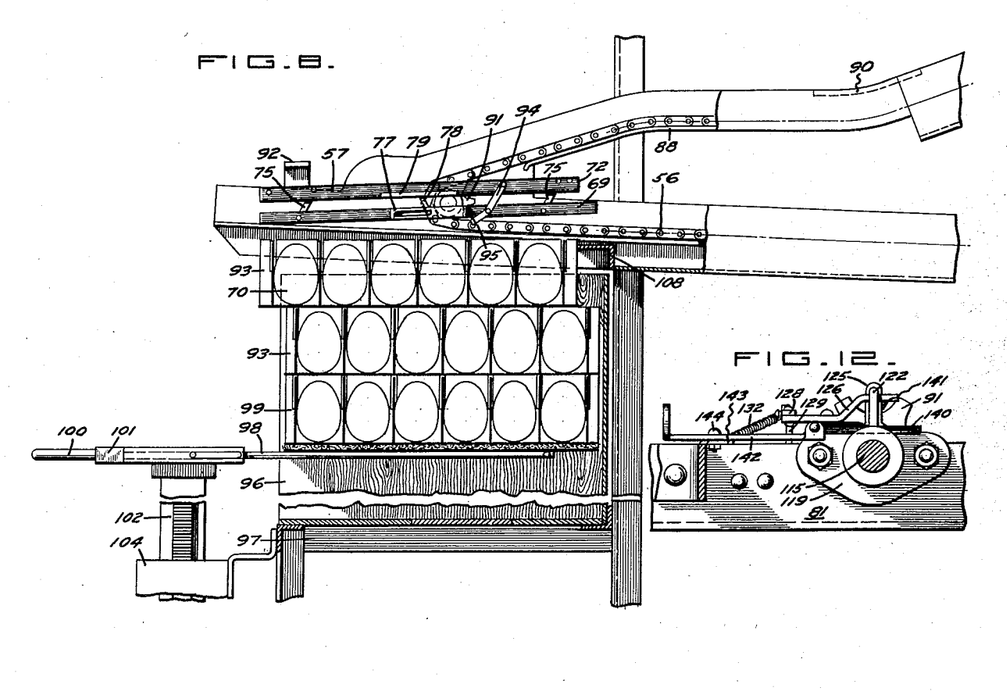
Fig. 8 is an enlarged view of the unloading end of the machine.
Fig. 12 is a sectional detail of the apparatus shown in Fig. 9.

The sprocket chains 56 extend at this end over guide wheels 91, and the carriers 57 are again prevented from turning over with the wheel by the aid of stops 92. However, the key 76 must of course turn with the link to which it is attached. This turning of the key 76 is in a counterclockwise direction as regards the tray 57, and it serves therefore to move the upper member 72 to the left laterally with respect to the lower frame. The moved-over position of frame 72 is illustrated in Fig. 8. The egg compartments formed by the strips 73 are thus moved so that the wires 71 cannot prevent the eggs 70 from dropping down into the paste-board cellular structure 93 provided for it at this point; in other words, the apertures in frames 69 and 72 are in alinement. It is to be noted that the links 75 rotate only through a relatively small angle in response to the complete rotation of key 76, and remain always to the right of the center line which is drawn through their lower pivots and perpendicular to the frames. There is thus never any danger that the upper frame 72 will be permanently displaced with respect to the lower frame 69, since the weight of the upper frame acts continually to return it to the loaded position of Fig. 6. There is further provided an additional closing device, such as the lever 94 pivoted to the frames 72 and 69, and provided with a dog 95. This dog is arranged to coact with the top surface of guide channel 81 after the tray 57 starts to move toward the front of the machine. This coaction is such that in case for any reason the frames 69 and 72 fail to resume their loaded position, lever 94 will be rotated in a clockwise direction about its pivot on the lower frame 69, and will forcibly return the upper frame to the position of Fig. 6. This forcible closing may for instance become necessary when one or more eggs have failed to drop entirely through the frame 69, or have become stuck in some way in the frame. The forcible closure will have no harmful effect upon the eggs retained in the frame. This is due to the effect that the intermeshing strips 73 are made of sufficiently pliable or flexible material so that they easily conform and adjust themselves to the eggs that may be retained without cracking them. The empty tray may now move forward to the right, where it may again be loaded while in motion by an attendant for the treatment of additional eggs. The process is thus seen to be a continuous one, and as many trays or carriers 57 may be employed in one machine as desired. In an ordinary working day, there has been no difficulty encountered in treating as many as 7500 dozen eggs.

The pasteboard compartments 93 may be positioned manually underneath the tray or carrier 57, and may be removed therefrom after the eggs 70 have been dropped in. Ordinarily, however, it is preferable to stack the layers of eggs directly into an open sided egg crate 96 positioned underneath the unloading end of the machine. For this purpose a table or support 97 shown in this instance as made up of angle irons, may be provided upon which the crate may rest. In order that the eggs as they are deposited in layers in the crate 96 shall need to drop but a slight distance below the carrier 57, a stand or support 98 is used, the height of which is adjustable. This support is shown in the present instance as composed of a plurality of slats upon which the bottom layer 99 rests. While this bottom layer was being filled from an egg tray 57 the platform or support 98 was in a raised position, and as succeeding layers are deposited, the support 98 is gradually lowered. When the support reaches the bottom of crate 96, and as many layers have been deposited thereon as the crate 96 can hold, the support may be moved out from under by the aid of a handle 100 attached to a member 101 in which the bars 98 are located. This member 101 is slidably supported near the top of a rack 102 which is used to move the platform 98 in a vertical direction. This rack is in turn guided by a pair of vertical standards 103, and passes through a gear box 104 in which a gear meshing with the rack 102 is provided. This gear may be manually rotated by the aid of a handle 105 extending outside of the box 104. In order to indicate how much this handle is to be rotated for lowering the platform 98 by an amount equivalent to the depth of one layer, there is a spring pressed pin 106 extending through the handle and cooperating with apertures 107 arranged in a circle in the front of box 104. The angular distance between these apertures corresponds to the proper movement of the handle, and as this handle is moved, the pin 106 is made to engage successive apertures 107.

As indicated in Fig. 8, the top layer which is being filled is laterally displaced from the other layers by an amount substantially equal to one-half of the width of one of the egg compartments. In other words, eggs 70 are deposited not directly over the lower layer, but in staggered relation thereto. This is of importance in preventing the eggs from cracking, for the vertical walls of the lower compartments form a column-like support of sufficient resiliency directly beneath each egg to cushion their fall very efficiently. After the eggs are deposited and platform 98 moved downward for the next layer, the top layer may be moved back manually so as to be in alinement with the rest of the layers. A new empty compartment may now be laid on top of the completed layer. For guiding the operator so that the proper staggered relation may be obtained between the top empty compartments and the lower filled ones, an angle iron 108 may be utilized, serving as a stop for the back edge of the cellular structure 93.

Figure 9:
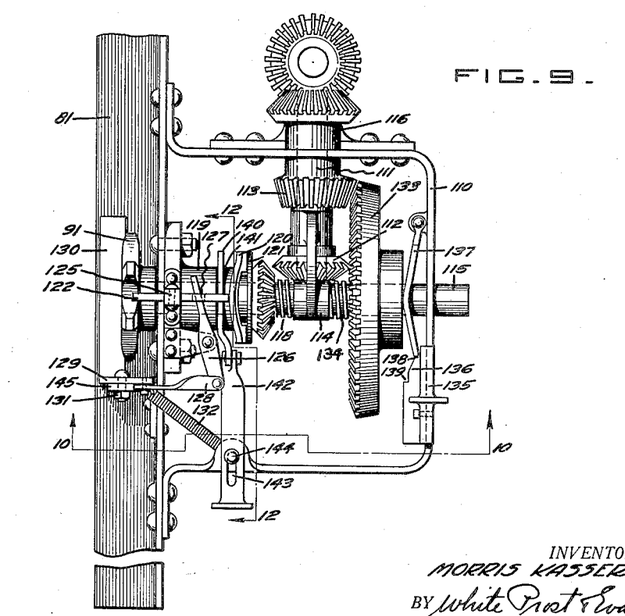
Fig. 9 is a top plan view of the control which may be utilized for causing successive layers of eggs to be deposited in an egg crate.
Figure 10:
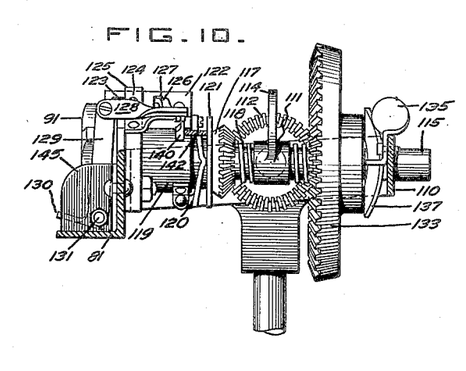
Fig. 10 is a sectional view taken along plane 10—10 of Fig. 9.

Although a manual operation of the platform moving device has been described, it is possible to provide a mechanism whereby this operation is performed automatically in response to the filling of the top layer. For this purpose one of the guide sprocket wheels 91 is used, as shown in Figs. 9 and 10, for operating the platform moving device. In this way motion is derived from the moving conveyor chain 56, although this motion is obtained intermittently as required for the movement of platform 98. A mechanical drive such as a system of gearing 109 is connected to drive the rack 102, and is appropriately supported on the structure for the unloading end of the machine.

A support 110 is appropriately fastened to guide channel 81, which support forms a structure holding substantially all of the control parts for the platform 98. The shaft 111 is journaled in this support, and forms one of the elements in the drive. Keyed to this shaft are a pair of pinions 112 and 113. In order to support the shaft 111 more firmly, a supporting casting 114 is provided, which embraces both the shaft 111 and the shaft 115 to which is fastened the driving sprocket wheel 91. Furthermore, a collar 116 is attached to shaft 111 externally of the frame 110 to prevent any possibility of material axial displacement.

The mechanical supports and the elements just described form only one of a variety of expedients which may be interchangeably utilized. The further elements of the drive, whereby rotation of shaft 111 is secured by the aid of the rotating wheel 91, will now be described. A bevel gear 117 is splined to shaft 115, whereby it is rotated with this shaft and axial movement is permitted between them. This gear is adapted to mesh with gear 112 but is normally urged away therefrom, as by a spring 118 interposed between the gear 117 and the support 114. A bearing member 119 for shaft 115 limits the movement of the gear 117 in response to the spring pressure.

In order to move the gear 117 into meshing relation so as to operate the platform 98, there is provided a shifter device 120 pivoted to the bottom of the bearing member 119, and engaging a collar 121 fastened to gear 117. To rotate this shifter against the action of spring 118, a push rod 122 is utilized, which is guided by the aid of slot 123 on a pin or screw 124 supported in a strap 125. This strap may conveniently be fastened to any appropriate stationary part of the mechanism. To move this rod 122, a pivoted lever 126 is utilized, one end of which engages an elongated slot 127 in the bar 122, and the other end of which is connected to a link 128. This link is adapted to be pulled to the left so as to urge rod 122 to the right, in response to the passage of a tray or carrier 57 on channel 81 just after it has discharged its load of eggs.

For this purpose the projection 77 of the egg carrier 57 is utilized, so that as it travels around sprocket wheel 91 and onto channel 81, it serves to rock a lever 129 about its pivot. This lever has an elongated foot 130 in the path of the projection 77, directly underneath the wheel 91, and is pivoted at 131 on an angle iron 145 fastened to the inside of the guide 81. The link 128 is pivoted to the upper end of the lever 129, and as the foot 130 is depressed by the passage of one of the projections 77 to the under side of the sprocket wheel 91, the link 128 is pulled to the left and operates the shifter rod 122. The length of the foot 130 determines the number of revolutions imparted to shaft 111 from gear 117, for as the projection 77 moves off the foot, it becomes released, and returns to the position shown in the figures by the aid of tension spring 132. Therefore the longer the foot 130 is, the longer it takes for it to be released. The length is, of course, so chosen that just the right amount of rotation is imparted to shaft 111 to lower the platform 98 by one layer.

After an egg crate 96 is completely filled, it is of course necessary to return the platform 98 to its topmost position, where the first of the layers may be deposited thereon. To effect this movement by power, a second bevel gear 133 is provided, splined on shaft 115 and adapted to mesh with gear 113. These gears however are kept out of mesh normally by the aid of spring 134, and they may be urged into meshing relation by manually operating a slide 135. This slide is supported on the inside of the frame 110, and has a cam surface 136 for urging the pivoted shifter 137 to the left. This shifter acts against the hub of wheel 133 and urges gears into meshing relation. By the aid of notches 138 and 139, the shifter 137 may be retained in either of its positions without the necessity of holding the slide 135 continuously. The gear 133 faces gear 117, so that the direction of rotation imparted to shaft 111 by the gear 133 is opposite to that imparted by gear 117.

It may be preferable at times to render the operation of the lowering of platform 98 entirely free from the mechanical drive just described. For this purpose, the shifter rod 122 may be lifted up so as to clear the top of the shifter 120, the rod 122 being freely rotatable about its pin support 124. Furthermore the slot 127 within which the pivoted lever 126 operates is elongated so as to permit this lifting movement to take place. To perform the lifting movement, a cam member 140 is utilized, which is guided in a slot 141 in the bearing member 119. This cam has a high part operating underneath the rod 122 to lift it up, and to slide the cam manually, a handle 142 is attached thereto. This handle has a slot 143 engaging stationary pin 144 to guide its movement.

The mechanical construction of the entire machine has now been described, and it is advisable here to summarize the complete operation. As the egg tray 57 moves to the right from the left hand side of the machine on the lower guide 81, an attendant fills up the tray with eggs to be treated. Upon reaching tank 21 at the right hand end, the tray 57 turns downward and passes first through the hot region at the top of branch 25. Continuing through branches 25 and 24, the eggs are kept immersed and pass into the cool region of oil. The eggs are thus gradually cooled to atmospheric temperature. Upon movement of the tray 57 out at the top of branch 24, it is guided around the driving sprockets 58 and onto the upper guides 88. Any excess moisture present drains down into the sloping drain 39 and re-enters the tank 21. The tray 57 now moves to the left, and is finally guided around the rear sprockets 91. While this is taking place, the key 76 attached to the chain link on which the tray is supported is revolved so as to engage the boss 79 on the upper part of frame 57 and to urge this part to the left so as to permit the eggs to drop between the wires 71 of the lower part of the frame. The eggs drop into compartments 93 formed of pasteboard. As the tray travels around sprockets 91, the mechanism for lowering the platform 98 that supports the eggs, is actuated, and empty compartments 93 are placed on top of the layers already filled. When one side of a crate 96 is thus filled up, the handle 100 is pulled out so as to let the bottom layer of eggs rest on the crate bottom, and then the entire crate is moved so as to present the empty side to the trays 57 as they reach the left side of the machine. When both sides of the crate are filled, a new crate is started. After the egg tray starts its movement to the right, it is again filled with eggs and the process begins again.

The eggs may be loaded into the tray in any desirable manner, and I prefer to employ a flat thin blade which is inserted under the filler containing a layer of eggs in an open side egg-case and place the filler over the tray and then slide the blade out from under the filler, permitting the eggs to fall into the compartments in the tray.

It should be noted that the egg tray moves downward along an inclined path into the hot liquid, thus causing the rows of eggs to be successively immersed in the liquid. It has been proposed heretofore to sink a horizontal tray vertically into the liquid, thus causing the simultaneous immersion of all of the eggs in the tray. It has been found, however, that the simultaneous introduction of a large number of eggs causes a rapid decrease in the temperature of the liquid and that the results obtained are not as uniform as if the temperature of the liquid remained constant. With the inclined feed of my present invention, the rows of eggs are successively submerged, so that the temperature may be maintained substantially constant.

I claim:

1. A liquid container comprising a pair of sections forming an angle, a conveyor extending through both sections, and means for supplying heat to one of the sections near its top.

2. In a machine of the character described, a conveyor, an egg carrier carried by the conveyor, said egg carrier having a bottom and relatively movable top portion, both having apertures, and means for alining the apertures so as to release the eggs.

3. In a machine of the character described, a conveyor, an egg carrier carried by the conveyor, said egg carrier having relatively movable apertured portions, and means responsive to the movement of the carrier to a definite position for alining the apertures to release the eggs.

4. In a machine of the character described, a conveyor, an egg carrier having a two-part frame with apertures in each part, means for moving the two parts so as to aline the apertures and release the eggs, and means responsive to the relative position of the conveyor and carrier for operating said releasing means.

5. In a machine of the character described, a conveyor, an egg carrier pivotally connected to the conveyor, a guide wheel for the conveyor, and means responsive to the movement of that portion of the conveyor which supports the carrier, over the guide wheel, for releasing the eggs in the carrier.

6. In a machine of the character described, a conveyor, an egg carrier pivotally connected to the conveyor, said carrier having two relatively movable apertured frames, a guide wheel for the conveyor, and means responsive to the movement of the carrier supporting portion of the conveyor over the guide wheel for moving the carrier frames so as to aline the apertures.

7. In a machine of the character described, a conveyor, an egg carrier pivotally connected to the conveyor, a guide wheel around which the conveyor travels, means for maintaining the carrier in its upright position, whereby the conveyor and carrier move pivotally with respect to each other as the guide wheel is passed, and means operated by this relative pivotal movement for causing the carrier to discharge.

8. In a machine of the character described, a conveyor, an egg carrier pivotally connected to the conveyor, said carrier having two relatively movable apertured frames, a guide wheel around which the conveyor travels, means for maintaining the carrier in its upright position, whereby the conveyor and carrier move pivotally with respect to each other as the guide wheel is passed, and means for moving the frames to aline the apertures, operated by this relative pivotal movement.

9. In a machine of the character described, a conveyor, an egg carrier carried by the conveyor, said carrier having two relatively movable apertured frames, means for moving the frames so as to aline the apertures and release the eggs, and means for returning the frames to their non-alining position.

10. In a machine of the character described, a conveyor, an egg carrier carried by the conveyor, said carrier having two relatively movable apertured frames, means responsive to the movement of the carrier to a definite position for moving the frames so as to aline the apertures and release the eggs, and means for returning the frames to their non-alining position.

11. A liquid container comprising two sections connected together, a second container located between the sections, means for permitting liquid from the first container to overflow into the second container, and a strainer arranged over the second container.

12. In a device for depositing objects in a series of layers, a platform, means for moving the platform in a vertical direction, a carrier, means for moving the carrier past the platform, and means responsive to the movement of the carrier beyond the platform for moving the platform by a predetermined amount.

13. In a device for depositing objects in a series of layers, a support for the layers, means for vertically moving the support, a carrier, means for moving the carrier past the support, and means actuated by the carrier after it moves past the support, for moving the support by a predetermined amount.

14. In a device for depositing objects in a series of layers, a support for the layers, a carrier, means for moving the carrier past the support, and a mechanical connection between said latter means and the support whereby it may serve to move the support vertically.

15. In a device for depositing objects in a series of layers, a support for the layers, a carrier, means for moving the carrier past the support, means for mechanically connecting the said moving means and the support, whereby said moving means may serve to move the support vertically, and means responsive to the movement of the carrier past the support for controlling this mechanical connection.

16. In a device for depositing objects in a series of layers, a support for the layers, a carrier, means for moving the carrier past the support, a mechanical drive for moving the support vertically, means for connecting this drive to be actuated by the movement of the carrier moving means, and a member in the path of movement of the carrier and operated thereby for performing the connection.

17. In a device for depositing objects in a series of layers, a support for the layers, a carrier, means for moving the carrier past the support, a gear for moving the support vertically, a second gear adapted to mesh with said gear and rotated by the carrier moving means, and means for meshing the gears.

18. In a device for depositing objects in a series of layers, a support for the layers, a carrier, means for moving the carrier past the support, a gear for moving the support vertically, a second gear adapted to mesh with said gear and rotated by the carrier moving means, and means for meshing the gears comprising a lever one end of which is in the path of movement of the carrier.

19. In a device for packing eggs into a crate having one of its sides open, a vertically movable support adapted to extend through the open side into the crate, and means for depositing successive layers of eggs on said support.

20. In a device for packing eggs into a crate having one of its sides open, a vertically movable support adapted to extend through the open side into the crate, means for depositing successive layers of eggs on said support, and means for moving the support vertically.

21. In a device for packing eggs into a crate having one of its sides open, a vertically movable support adapted to extend through the open side into the crate, and means for moving the support vertically.

22. In a device for packing eggs into a crate with cellular compartments, a base for the crate, means for depositing successive layers of eggs in the crate, means for lowering the successive layers into the crate, and a member serving as a stop for the cellular compartment structure positioned for the layer to be deposited, whereby the layers as they are deposited are out of alinement with the bottom layers.

23. In a device for packing eggs into a crate having successive layers of cellular compartment structures, a vertically movable support for the layers, means for moving the support, and a stop member for the cellular structure that is positioned for the layer to be deposited, whereby the layers as they are deposited are out of alinement with the bottom layers, and may be moved into alinement after the support is lowered.

24. In a machine of the character described, a liquid container, a conveyor extending through said container and an egg carrier carried by the conveyor into the container at an angle, so the eggs on the carrier are successively submerged in the liquid in the container.

25. In a machine of the character described, a liquid container, an egg carrier adapted to contain a plurality of rows of eggs and means for moving the carrier in an inclined position along an inclined path into the container.

In testimony whereof, I have hereunto set my hand.

MORRIS KASSER.